Jan. 19, 1937.  C. GOTTWALD  2,068,019

THERMO NONCONDUCTING PACKING MATERIAL

Filed Aug. 8, 1931

Inventor
Christian Gottwald
Kwis Hudson & Kent
attys.

Patented Jan. 19, 1937

2,068,019

UNITED STATES PATENT OFFICE 2,068,019

THERMO NONCONDUCTING PACKING MATERIAL

Christian Gottwald, Cleveland Heights, Ohio, assignor to The Ric-Wil Company, Cleveland, Ohio, a corporation of Ohio Application August 8, 1931, Serial No. 556,026

12 Claims. (Cl. 106—18)

The present invention, in one of its phases, relates to a construction for containing underground pipes in which it is desired to protect the pipe or pipes by housing them in a conduit, providing drainage facilities for the conduit, and also providing a heat insulating packing surrounding the pipe within the conduit.

Another phase of the present invention relates to a heat insulating composition or packing material suitable for use as a heat insulating packing around pipes, wherein the fibers of the packing are rendered water repellent, so that the packing will not become impregnated with water or liquids but, on the contrary, will repel such liquids so that the same may be discharged through suitable provisions in the conduit or other container within which the water repellent packing material may be contained.

Reference should be had to the accompanying drawing, in which.

Figure 1:
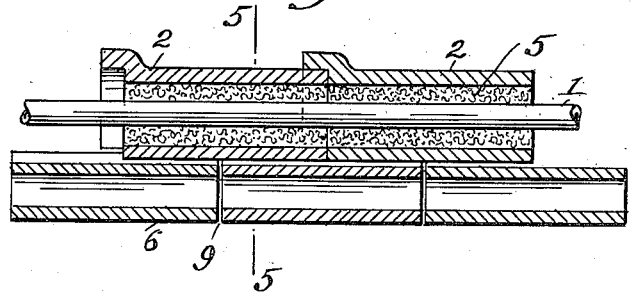
Fig. 1 is a sectional elevation of a structure embodying my invention.
Figure 2:
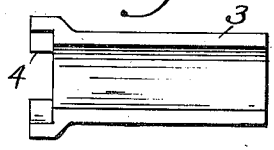
Fig. 2 is a bottom plan view of a half of a conduit.
Figure 3:
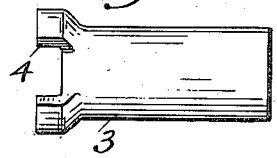
Fig. 3 is a top plan view of a half of a conduit.

In the drawing, 1 represents a pipe adapted to transmit steam, hot liquid or cold liquid. This pipe is suitably mounted within a conduit which, in the present instance, is shown as a conduit comprising a top section 2 having a bell and spigot end and a lower section 3, which has a bell and spigot end, the bell end of the lower section being indicated at 4.

The conduit sections are fitted together as indicated in Fig. 1, and within the interior of the conduit sections and surrounding the pipe, is a fibrous heat insulating material 5, which is suitably treated to render the same water repellent.

Figure 4:
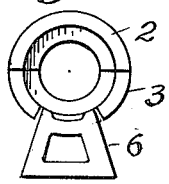
Fig. 4 is an end elevation of a conduit mounted on a base drain.
Figure 5:
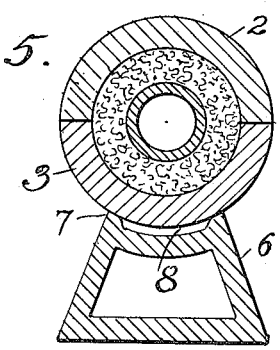
Fig. 5 is a section on the line 5—5 of Fig. 1.

Preferably the conduit sections are mounted upon base drain members 6, such base drains being shown more particularly in Figs. 4 and 5. The base drain comprises a hollow member, the side walls of which are formed with ridge extensions which are adapted to receive and support the lower conduit sections 3. In the particular form of base drain shown the notch 4 in the bell end of the lower conduit section will straddle the base, as clearly shown in Fig. 4. Base drain sections are placed a slight distance apart at their adjacent ends, therefore, any moisture or liquid which may, in any way, come upon the inside of the conduit sections will drain toward the end of each conduit section and be discharged through the base drain.

As before stated, the pipe 1 is surrounded by fibrous heat insulating material 5, which has been treated to render the same water repellent. Therefore, if condensed moisture or other liquid comes within the conduit, such liquid will not be absorbed by the fibrous packing material but will be repelled and find its way to the lower portion of the conduit sections and will be drained away.

The usual forms of thermo-nonconductors, such as asbestos, rock wool and mineral wool which are in their nature composed of silicious fibers, are of themselves water-proof, that is to say, the fibers themselves will not absorb water, but when such fibrous material is used for thermo packing material, it is necessary that the mass be more or less loosely placed around the pipe or other device to be heat insulated, in order to provide the small interstices between the fibers to give the required heat insulating properties.

It is because of the fact that there are these necessary interstices, due to the loose placing of the heat insulating material, that provides a lodging place for moisture and water, which when filling these interstices causes the packing material, as a whole, to become water-logged thus making it inefficient if not entirely useless for its intended purpose.

The water repellent packing material, to which reference has heretofore been made, is composed of silicious fibrous material such, for instance, as asbestos, rock wool or mineral wool, which has been treated with an insoluble soap so as to thoroughly coat the fibers of the material and thus render them water repellent. So far as the present invention is concerned, the method of coating the fibers is immaterial, but it may be said that the insoluble soap in finely divided form may be thoroughly mixed and agitated with the mineral fibers, and when so treated, will accomplish the desired result.

An insoluble soap which I have found to be effective for the purpose is aluminum stearate, which is also chemically known as a metallic soap.

If desired the packing material may be made up of silicious fibrous material, such as asbestos, mineral wool and rock wool, together with comminuted sponge in which the materials mentioned are treated to make them water repellent.

Sponge material, as is well known, is an animal product growing beneath sea water, and when gathered and dried retains in its pores certain of the salts which are dissolved in the ocean water. It is desirable, if not indeed necessary, when using this material in the manner above suggested, to treat the sponge for the purpose of removing its impurities, and furthermore, the untreated or natural dried sponge is not so porous and bulky as is desired. Therefore, the raw sponge is first reduced to a comminuted condition in any suitable manner, so that the particles are approximately the size of a pea or bean. The sponge is then thoroughly treated to remove the salt, this process including a thorough washing and subsequent drying. As a result of such treatment the sponge is not only cleansed of its undesirable salts, but is rendered more bulky and consequently more porous.

The prepared sponge, together with shredded asbestos, or mineral wool or rock wool and insoluble soap, such as aluminum stearate, are thoroughly and intimately mixed. Experience has demonstrated that by proper mixing, the fibrous or silicious material will wrap around the sponge particles until upon superficial view it is impossible to detect the presence of the sponge. This mixture of the asbestos and sponge produces a fluffy, unmatted mass, in which the particles are loosely associated and in a condition which makes the same particularly suitable for use as heat insulating material.

A thorough mixture of the ingredients above mentioned results in the fibers of the asbestos being thoroughly coated and the spongy material is thoroughly impregnated with the insoluble soap.

One of the most important characteristics which the sponge imparts to the mixture is that of materially relieving against the tendency of the material to sag after it has been in use as a heat insulating material for a period of time. Because of the fact that when the heat insulating material is placed in position around the conduit, it is necessary that there be a certain looseness to provide interstices between the fibers, there is, after a period of time, a tendency for the packing material to settle. Where the comminuted sponge is mixed with the asbestos it materially lessens the tendency of the packing material to sag or slump.

From the foregoing specification it is pointed out that by the term "water repellent" there is meant something different from water-proof. As has before been pointed out in this specification, a mass of mineral fibers, such as asbestos, although naturally water-proof, may nevertheless become so impregnated with water that it becomes water soaked, and thereby its heat insulating properties are destroyed.

While the invention herein disclosed has been more particularly in connection with its use as a packing material for underground conduits, it will be understood that this material may be used in other places and under other conditions, wherein moisture-proof or water repellent material may be desired, such for instance, as in packings for refrigerators, fire-proof cabinets or other similar structures.

This application is filed as a continuation in part of application Serial No. 141,450, filed October 14, 1926 in the name of Christian Gottwald, entitled Underground conduit construction and application Serial No. 262,592, filed March 17, 1928 in the name of Christian Gottwald, entitled Improved thermo packing material.

Having thus described my invention what I claim is:

1. A thermo non-conducting packing material comprising a mass of loosely associated asbestos fibers which have been treated with an insoluble soap to render them water repellent.

2. A thermo non-conducting packing material comprising a mass of non-adhering loosely associated asbestos fibers which have been treated with an insoluble soap to render them water repellent.

3. Heat insulating material comprising a discrete, open assemblage of mineral fibers, said fibers typically having a thin, substantially uniform, continuously coalesced coating of insoluble soap.

4. A thermo non-conducting packing material, comprising a mass of non-adhering, loosely associated asbestos fibers which have been treated with aluminum stearate to render them water repellent.

5. A composition of matter comprising fibers as to which water has normally a negative meniscus, and particles of a solid material capable of imparting to water a positive meniscus.

6. A composition of matter comprising fibrous material and finely divided non-adhesive solid material capable of increasing the surface tension of water.

7. The process of rendering normally absorptive fibrous material water repellent which comprises mingling with said fibrous material finely divided solid material capable of increasing the surface tension of water.

8. A composition of matter comprising incombustible fibrous material and finely divided non-adhesive solid material capable of increasing the surface tension of water.

9. A composition of matter comprising mineral fibrous material and finely divided non-adhesive solid material capable of increasing the surface tension of water.

10. A composition of matter comprising asbestos fibrous material and finely divided non-adhesive solid material capable of increasing the surface tension of water.

11. A composition of matter comprising fibrous material and finely divided non-adhesive solid material capable of distributing itself upon the surface of water and increasing its surface tension.

12. The process of rendering normally absorptive fibrous material water repellent which comprises mingling with said fibrous material finely divided solid material capable of distributing itself upon the surface of water and increasing its surface tension.

CHRISTIAN GOTTWALD.